(12) United States Patent
Barkelew

(10) Patent No.: US 8,438,423 B1
(45) Date of Patent: May 7, 2013

(54) INVALID SETUP RECOVERY

(75) Inventor: Jonathan Bret Barkelew, Atlanta, GA (US)

(73) Assignee: American Megatrends, Inc., Norcross, GA (US)

( * ) Notice: Subject to any disclaimer, the term of this patent is extended or adjusted under 35 U.S.C. 154(b) by 273 days.

(21) Appl. No.: 12/415,016

(22) Filed: Mar. 31, 2009

(51) Int. Cl.
*G06F 11/00* (2006.01)

(52) U.S. Cl.
USPC .............................. 714/36; 714/47.2; 713/2

(58) Field of Classification Search ............ 714/36, 714/47.2; 713/2
See application file for complete search history.

(56) References Cited

U.S. PATENT DOCUMENTS

| | | | | |
|---|---|---|---|---|
| 5,475,839 | A * | 12/1995 | Watson et al. | 713/2 |
| 5,974,546 | A * | 10/1999 | Anderson | 713/2 |
| 6,671,802 | B1 * | 12/2003 | Ott | 713/100 |
| 6,829,725 | B2 * | 12/2004 | Gurumoorthy et al. | 714/23 |
| 6,934,881 | B2 * | 8/2005 | Gold et al. | 714/15 |
| 6,948,099 | B1 * | 9/2005 | Tallam | 714/38 |
| 7,340,638 | B2 * | 3/2008 | Nicholson et al. | 714/6 |
| 7,734,945 | B1 * | 6/2010 | Levidow et al. | 714/3 |
| 2002/0042892 | A1 * | 4/2002 | Gold | 714/6 |
| 2002/0053047 | A1 * | 5/2002 | Gold | 714/45 |
| 2004/0039872 | A1 * | 2/2004 | Takamizawa et al. | 711/103 |
| 2004/0088531 | A1 * | 5/2004 | Rothman | 713/1 |
| 2004/0153724 | A1 * | 8/2004 | Nicholson et al. | 714/6 |
| 2004/0158699 | A1 * | 8/2004 | Rhoads et al. | 713/1 |
| 2005/0283638 | A1 * | 12/2005 | Kato | 714/2 |
| 2006/0059327 | A1 * | 3/2006 | Brown et al. | 713/1 |
| 2006/0062046 | A1 * | 3/2006 | Babudri et al. | 365/185.09 |
| 2006/0123223 | A1 * | 6/2006 | Mayfield et al. | 713/2 |
| 2006/0277433 | A1 * | 12/2006 | Largman et al. | 714/15 |
| 2007/0033322 | A1 * | 2/2007 | Zimmer et al. | 711/103 |
| 2007/0150651 | A1 * | 6/2007 | Nemiroff et al. | 711/114 |
| 2007/0157015 | A1 * | 7/2007 | Swanson et al. | 713/2 |
| 2008/0072028 | A1 * | 3/2008 | Allison et al. | 713/1 |
| 2008/0148038 | A1 * | 6/2008 | Abe et al. | 713/2 |
| 2008/0168299 | A1 * | 7/2008 | Kateley et al. | 714/2 |
| 2009/0125660 | A1 * | 5/2009 | Nemirovsky et al. | 710/260 |
| 2009/0271660 | A1 * | 10/2009 | Chin et al. | 714/15 |
| 2009/0292911 | A1 * | 11/2009 | Chien | 713/2 |
| 2010/0090729 | A1 * | 4/2010 | Shi | 327/143 |

\* cited by examiner

*Primary Examiner* — Scott Baderman
*Assistant Examiner* — Loan Truong
(74) *Attorney, Agent, or Firm* — Hope Baldauff, LLC

(57) ABSTRACT

Technologies are described herein for allowing a computer system to recover from an invalid configuration, without requiring any modifications to the hardware of the computer system by the user. The computer determines whether a boot-fail counter exceeds a threshold value. If the boot-fail counter exceeds the threshold value, the computer executes an exception processing routine. In one aspect, the exception processing routine causes the computer to reset configuration settings stored in a memory area of the computer to default configuration settings. If the boot-fail counter does not exceed the threshold value, the computer increments the boot-fail counter and executes system initialization routines for booting the computer. Upon successfully completing the system initialization routines, the computer resets the boot-fail counter.

17 Claims, 5 Drawing Sheets

INVALID SETUP RECOVERY

BACKGROUND

Computer systems commonly include configuration settings that are used to initialize a computer system and control aspects of the system during runtime. Configuration settings may be altered such that the computer system may hang during initialization, thereby preventing a user from accessing the computer system to troubleshoot or modify the settings. This problem is particularly likely when dealing with original equipment manufacturers ("OEMs") that have not filtered the list of set up options to reduce the risk of a user altering configuration settings to conflicting settings.

In traditional systems where the configuration settings are stored in a complementary metal oxide semiconductor ("CMOS") based memory, this problem could easily be remedied by clearing the CMOS, either by removing the battery or by setting a jumper. However, in modern flash-based systems, addressing the problem is more difficult. For instance, in current, non-volatile random access memory ("NVRAM") based systems, removing the battery will not clear the invalid configuration settings. Moreover, in many enclosed systems where accessing the internal components of the system is cumbersome, such as a laptop, accessing the battery or setting a jumper inside the internal circuitry of the system may be difficult.

It is with respect to these and other considerations that the disclosure made herein is presented.

SUMMARY

Technologies are described herein for allowing a computer system to recover from an invalid configuration, without requiring any modifications to the hardware of the computer system by the user. In order for a computer to recover from an invalid configuration, the computer determines whether a boot-fail counter exceeds a threshold value. If the boot-fail counter exceeds the threshold value, the computer executes an exception processing routine. In one aspect, the exception processing routine causes the computer to reset configuration settings stored in a memory area of the computer to default configuration settings. If the boot-fail counter does not exceed the threshold value, the computer increments the boot-fail counter and executes system initialization routines for booting the computer. Upon successfully completing the system initialization routines, the computer resets the boot-fail counter.

It should be appreciated that the above-described subject matter may also be implemented as a computer-controlled apparatus, a computer process, a computing system, or as an article of manufacture such as a computer-readable medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

Figure 1:
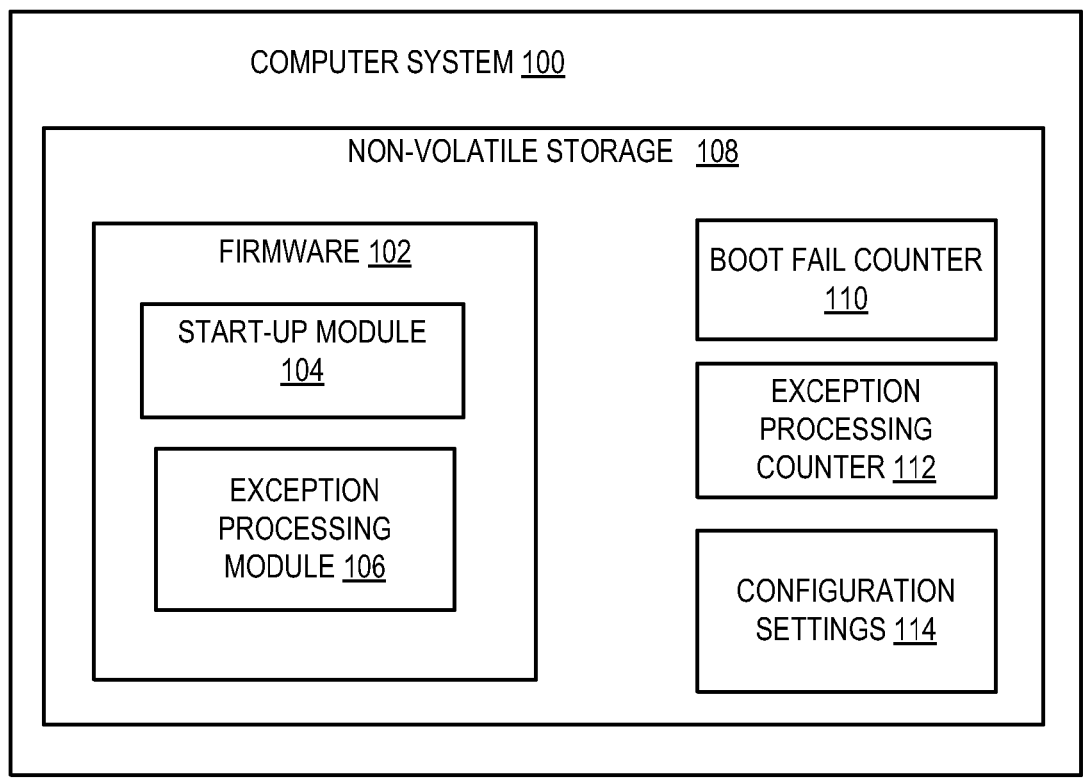
FIG. 1 is a computer architecture diagram illustrating a computing system capable of recovering from an invalid configuration, according to embodiments.

The following detailed description is directed to technologies for allowing a computer system to recover from invalid configuration settings without requiring a user to make any modifications to the hardware of the computer system. While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like. The embodiments described herein may also be practiced in distributed computing environments where tasks are performed by remote processing devices that are linked through a communications network. In a distributed computing environment, program modules may be located in both local and remote memory storage devices.

In the following detailed description, references are made to the accompanying drawings that form a part hereof, and that show, by way of illustration, specific embodiments or examples. Referring now to the drawings, in which like numerals represent like elements through the several figures, aspects of a computing system and methodology for recovering from invalid configuration settings will be described.

FIG. 1 shows a computer system 100 that includes a firmware 102. Typically, firmware may be defined as software that is stored in a non-volatile storage area 108 of a computer system that provides the computer system with boot services and/or runtime services. The firmware 102 may be traditional Basic Input Output System ("BIOS"), Extensible Firmware Interface ("EFI") based firmware, or any other firmware. In one embodiment, the firmware may be a combination of more than one type of firmware.

The firmware 102 includes routines that execute during start-up of the computer system 100 as well as routines that execute during run-time. According to embodiments, the firmware 102 includes a start-up module 104 that executes a start-up routine that includes system initialization routines for starting-up the computer system 100, as will be described in more detail below in regard to FIG. 2. System initialization routines include routines to initialize various hardware and software components of the computer system 100. The firmware 102 also includes an exception processing module 106, which executes an exception processing routine if the computer system 100 fails to be initialized by the system initialization routines, as will be described in more detail below in regard to FIG. 3.

The non-volatile storage area 108 may be an NVRAM storage area or a CMOS memory storage area, or a storage area that provides non-volatile storage using another type of medium or technology. The non-volatile storage area 108 also stores configuration settings 114. The configuration settings 114 may include settings used by the start-up module 104 to initialize the computer system 100 upon start-up. If the configuration settings 114 are invalid, the computer system 100 may not be able to successfully complete the system initialization routines and therefore, the computer system 100 may fail to successfully boot.

In older computer systems, configuration settings were typically stored in a battery powered CMOS memory area, whereby the default configuration settings would be restored upon removal of the battery or setting a jumper inside the computer system. According to embodiments described herein, the configuration settings 114 for the computer system 100 may be stored in the non-volatile storage area 108 and may not reset to default settings by removal of a battery, or the jumper to restore defaults may be inaccessible to a user. Therefore, invalid configuration settings 114 may remain stored in the non-volatile storage area 108 even if the computer system 100 is rebooted after a failed boot attempt. In order to boot the computer system 100, the computer system may need to reset the configuration settings 114 stored in the non-volatile storage area 108 to valid default settings, without a user accessing the internal hardware components of the computer system 100.

In one embodiment, the non-volatile storage area 108 includes a boot-fail counter 110 and an exception processing counter 112. The boot-fail counter 110 is utilized to keep track of the number of failed boot attempts the computer system 100 has had since the last successful start-up, and the exception processing counter 112 is utilized to keep track of the number of times the exception processing routine has been performed since the last successful start-up, as will be described below in regard to FIGS. 2 and 4.

Figure 2:
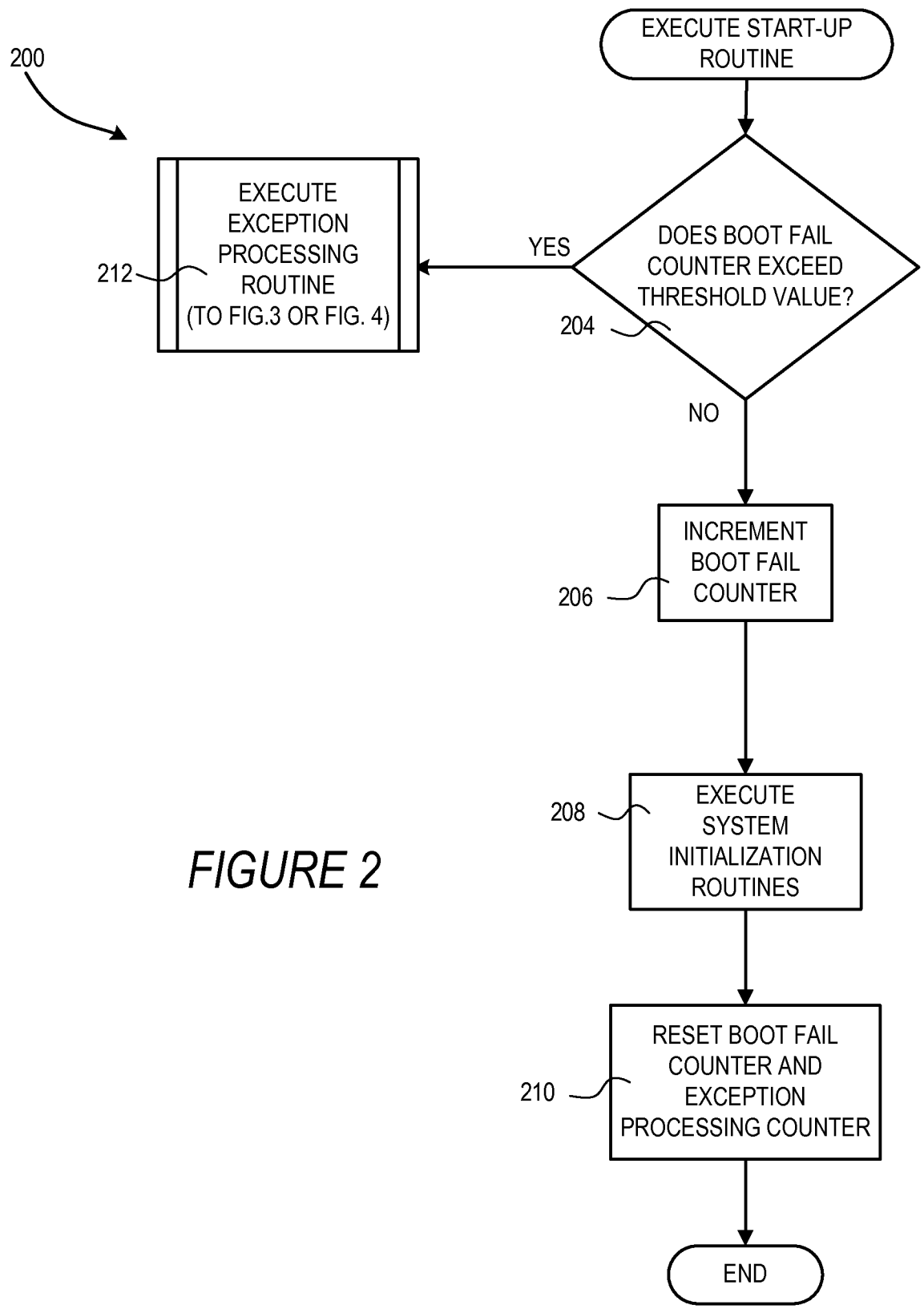
FIG. 2 is a logical flow diagram illustrating one method for recovering from an invalid configuration, according to one embodiment.

FIG. 2 shows a logical flow diagram illustrating a computer start-up routine 200 that causes a computer system 100 to recover from an invalid configuration. The start-up routine 200 begins at operation 204, where the start-up module 104 determines whether the boot-fail counter 110 exceeds a threshold value. The threshold value may be a value that is pre-defined in the firmware 102 of the computer system 100, such that the computer system allows rebooting of the system a threshold number of times before causing the start-up module 104 to call the exception processing module 106 to execute the exception processing routine 300. The threshold value may also be specified by a user.

If the boot-fail counter 110 does not exceed the threshold value, then the start-up routine 200 proceeds to operation 206, where the start-up module 104 increments the boot-fail counter 110. The start-up routine 200 then proceeds to operation 208, where the start-up module 104 executes system initialization routines for booting the computer system 100, using the configuration settings 114 stored in the non-volatile storage area 108. If the configuration settings 114 are valid, the booting of the computer may be successful, unless another type of hardware failure or incompatibility prevents the computer system 100 from booting. Upon the successful completion of the execution of the system initialization routines, the start-up routine 200 then proceeds to operation 210, where the start-up module 104 resets both the boot-fail counter 110 and the exception processing counter 112 to zero. From operation 210, the start-up routine 200 ends.

If the configuration settings 114 are not valid, the system initialization routine may not successfully complete, thereby causing the start-up routine 200 to hang or end prematurely. In one embodiment, the start-up module 104 may be capable of automatically rebooting the computer system 100, such that the start-up routine 200 is executed again. In an alternative embodiment, a user may manually reboot the computer system 100, causing the start-up routine 200 to be executed again at operation 204.

As long as the boot-fail counter 110 does not exceed the threshold value, the start-up module 104 tries to complete the start-up routine 200. If, however, the boot-fail counter 110 exceeds the threshold value at operation 204, the start-up routine 200 proceeds to operation 212 where the start-up module 104 calls the exception processing module 106 to execute an exception processing routine, as will be described in more detail below in regard to FIGS. 3 and 4. In an alternative embodiment, the start-up module 104 may execute the exception processing routine.

Figure 3:
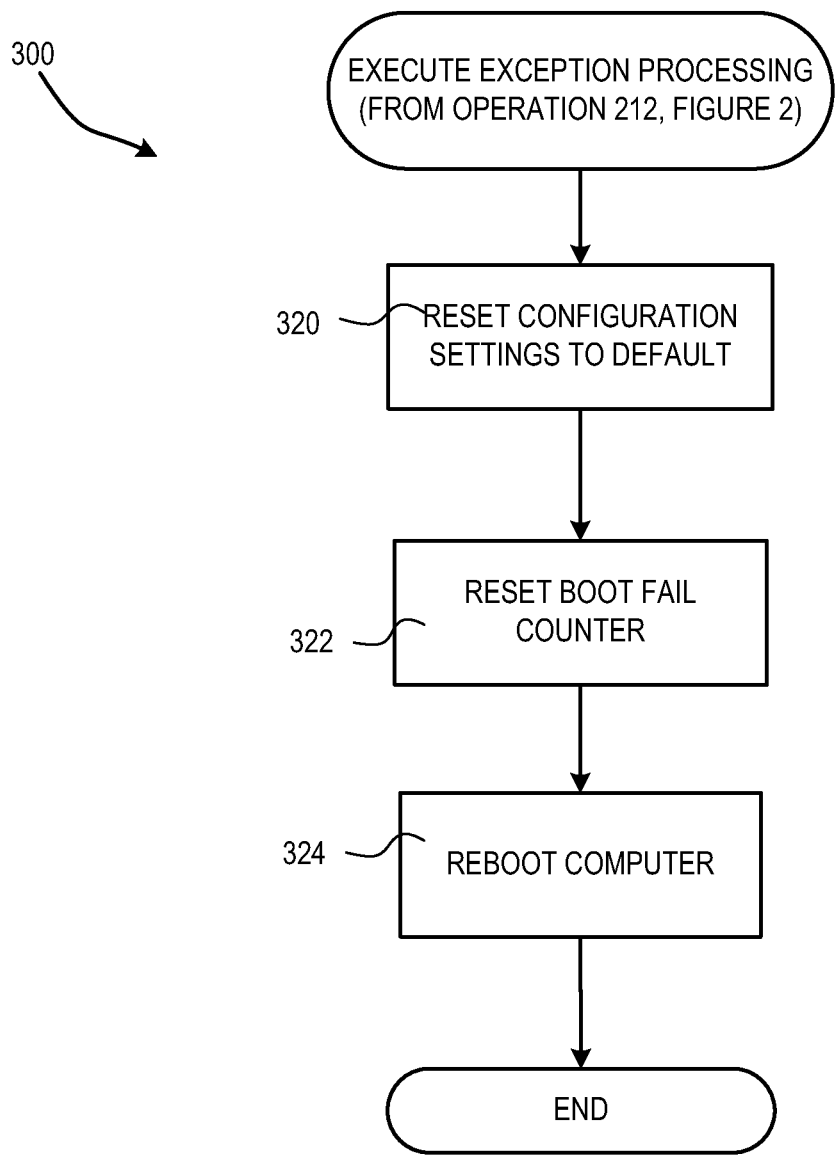
FIG. 3 is a logical flow diagram illustrating one method of processing an exception during start-up, according to one embodiment.

FIG. 3 is a logical flow diagram that illustrates an exception processing routine 300 executed by the exception processing module 106 upon being invoked by the start-up module 104, as described above in respect to operation 212. The exception processing routine 300 includes a set of computer-executable instructions, which when executed by the computer system 100, causes the computer system 100 to reset the invalid configuration settings 114 to default settings, as described herein.

The exception processing routine 300 begins at operation 320, where the exception processing module 106 resets all of the configuration settings 114 stored in the non-volatile storage area 108 to default configuration settings. From operation 320, the exception processing routine 300 then proceeds to operation 322, where the exception processing module 106 resets the boot-fail counter 110 to zero. The exception processing routine 300 then proceeds to operation 324, where the exception processing module 106 reboots the computer system 100. Upon rebooting, the exception processing routine 300 ends and the start-up routine 200 is executed again. Typically, the start-up module 104 should successfully complete the system initialization routines after the configuration settings 114 have been reset to default settings, unless another type of hardware failure or incompatibility prevents the computer system 100 from booting.

Figure 4:
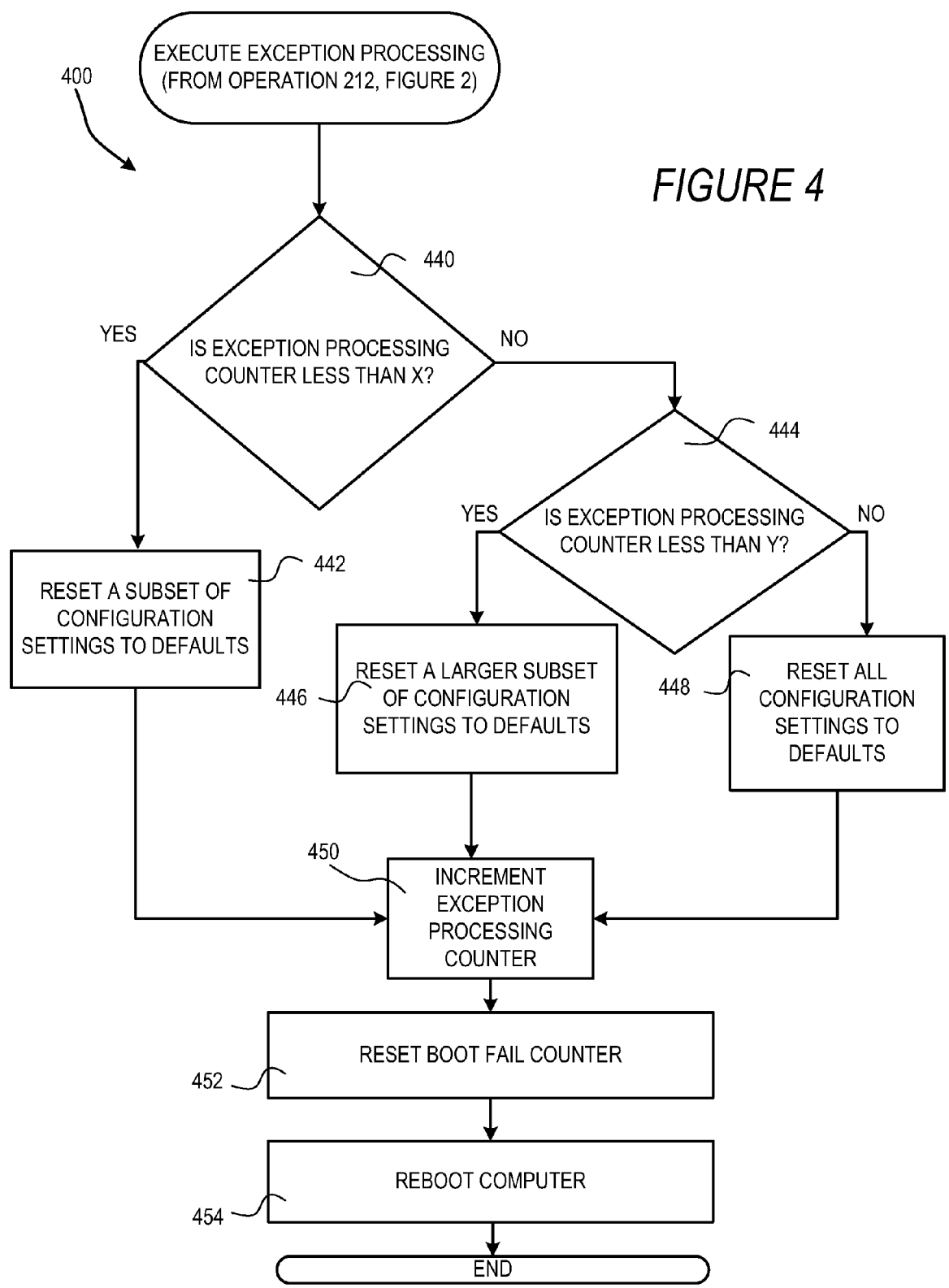
FIG. 4 is a logical flow diagram illustrating another method of processing an exception during start-up, according to another embodiment of the present disclosure.

FIG. 4 shows an alternative exception processing routine 400 executed by the exception processing module 106, according to another embodiment. The exception processing routine 400 includes a set of computer-executable instructions, that when executed by the computer system 100, causes the computer system 100 to progressively reset a larger subset of the invalid configuration settings 114 to default settings, as described herein.

The exception processing routine 400 utilizes the exception processing counter 112, which is initially set at zero. The exception processing routine 400 begins at operation 440, where the exception processing module 106 determines whether the exception processing counter 112 is less than a first pre-determined or user-configurable value, referred to herein as X. The value of X will typically be one. If the exception processing counter 112 is less than X, the exception processing routine 400 proceeds to operation 442, where the exception processing module 106 resets a subset of the configuration settings 114 to default settings. The subset of the configuration settings 114 may include only a few settings that may be essential to successfully complete the system initialization routines for the computer system 100. After resetting a subset of the configuration settings 114 at operation 442, the exception processing routine 400 proceeds to operation 450.

If, however, at operation 440, the exception processing module 106 determines that the exception processing counter 112 is not less than X, the exception processing routine 400 proceeds to operation 444, where the exception processing module 106 determines whether the exception processing counter 112 is less than a second user-configurable or predetermined value, referred to herein as Y. The value of Y will typically be two. If the exception processing counter 112 is less than Y, the exception processing routine 400 proceeds to operation 446, where the exception processing module 106 resets a larger subset of the configuration settings 114 to default configuration settings.

The larger subset of configuration settings 114 may include all, some or none of the subset of configuration settings 114 that were reset by the exception processing routine 400 in operation 442 described above. Upon resetting the larger subset of the configuration settings 114 to their default values, the exception processing routine 400 proceeds to operation 450.

If, at operation 444, the exception processing counter 112 is not less than X and not less than Y, the exception processing routine 400 proceeds to operation 448, where all of the configuration settings 114 are reset to default configuration settings. Upon resetting all of the configuration settings to default values, the exception processing routine 400 proceeds to operation 450.

At operation 450, the exception processing module 106 increments the exception processing counter 112. From operation 450, the exception processing routine 400 proceeds to operation 452, where the exception processing module 106 resets the boot-fail counter 110. From operation 452, the exception processing routine 400 proceeds to operation 454, where the exception processing module 106 reboots the computer system 100. From operation 454, the routine 400 ends.

Upon reboot of the computer system 100, the start-up module proceeds to execute the start-up routine 200, as described in regard to FIG. 2. Upon successful completion of the system initialization routines, both the boot-fail counter 110 and the exception processing counter 112 are reset.

It will be appreciated that the exception processing routine is not limited to the exception processing routines 300 and 400 as described herein with regard to FIGS. 3 and 4. Rather, the exception processing routine can reset various subsets of the configuration settings 114 in any particular order, in a single operation, or in multiple operations. Further, the number of times the start-up module calls the exception processing module may be altered to allow for more iterations of resetting the configuration settings. In one embodiment, the exception processing routine may reset the invalid configuration settings to pre-defined safe mode configuration settings, such that upon rebooting the computer system 100, the computer system 100 executes the system initialization routines using the pre-defined safe mode configuration settings and thereby starting the computer in a safe mode state.

Figure 5:
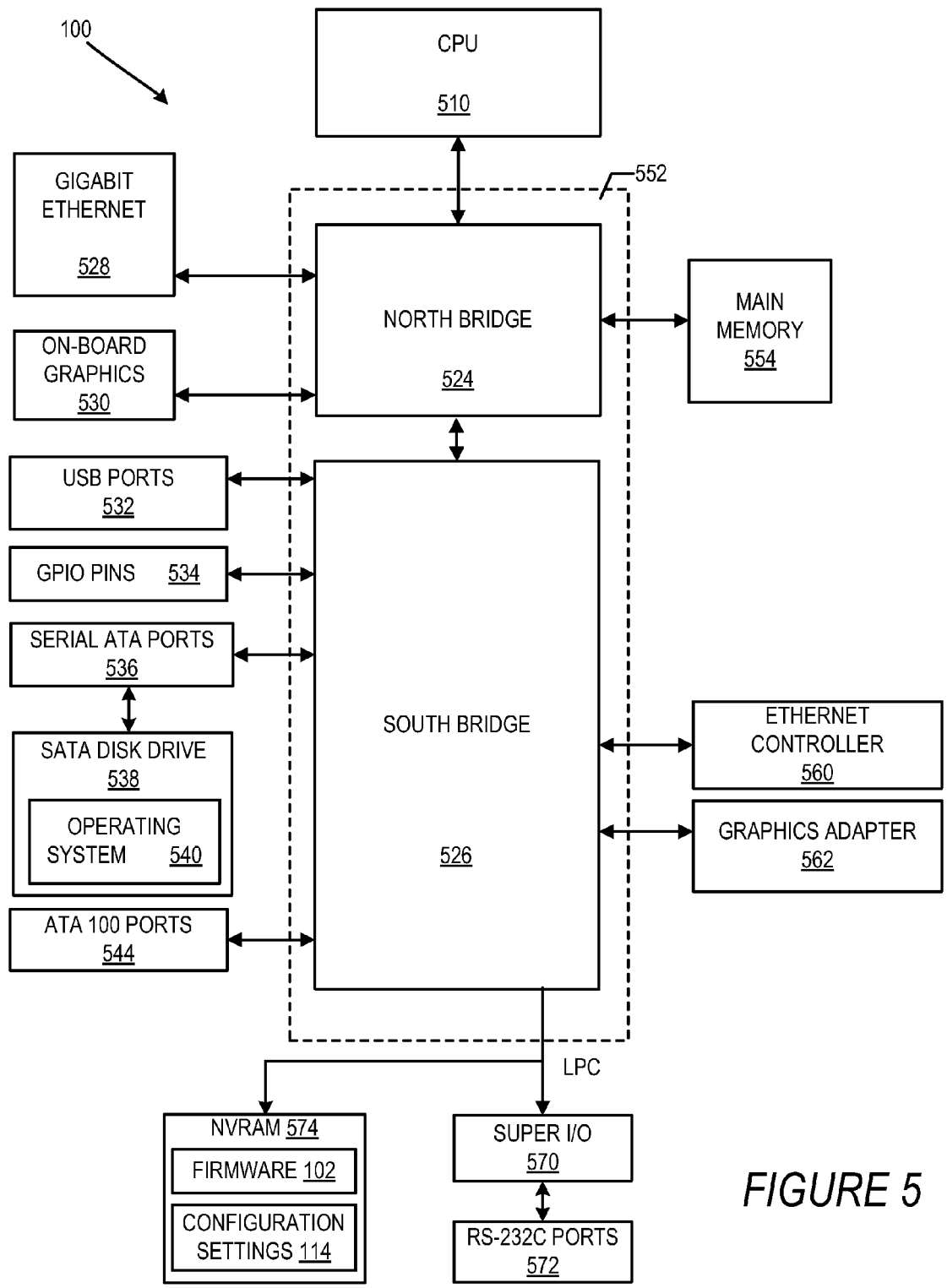
FIG. 5 is a computer architecture diagram illustrating one computer hardware architecture for a computing system capable of recovering from an invalid configuration.

FIG. 5 shows one computer architecture for the computer system 100 that may be utilized in the implementations described herein. The computer system 100 includes a baseboard, or "motherboard", which is a printed circuit board to which a multitude of components or devices may be connected by way of a system bus or other electrical communication paths. In one illustrative embodiment, a CPU 510 operates in conjunction with a chipset 552. The CPU 510 is a standard central processor that performs arithmetic and logical operations necessary for the operation of the computer. The storage node computer system 100 may include a multitude of CPUs 510. Software modules stored in various storage media of the computer system 100 may, when loaded into the CPU 510 and executed, transform the CPU 510 and the overall computer system 100 from a general-purpose computing system into a special-purpose computer system customized to facilitate booting up a computer system having invalid configuration settings. The CPU 510 may be constructed from any number of transistors or other discrete circuit elements, which may individually or collectively assume any number of states. More specifically, the CPU 510 may operate as a finite state machine, in response to executable instructions contained within the start-up module 104 and the exception processing module 106 stored in the non-volatile storage area 108. These computer-executable instructions may transform the CPU 510 by specifying how the CPU 510 transition between states, thereby transforming the transistors or other discrete hardware elements constituting the CPU 510.

The chipset 552 includes a north bridge 524 and a south bridge 526. The north bridge 524 provides an interface between the CPU 510 and the remainder of the computer system 100. The north bridge 524 also provides an interface to a random access memory ("RAM") used as the main memory 554 in the computer system 100 and, possibly, to an on-board graphics adapter 530. The north bridge 524 may also include functionality for providing networking functionality through a gigabit Ethernet adapter 528. The gigabit Ethernet adapter 528 is capable of connecting the computer system 100 to another computer via a network. Connections which may be made by the network adapter 528 may include LAN or WAN connections. LAN and WAN networking environments are commonplace in offices, enterprise-wide computer networks, intranets, and the internet. The north bridge 524 is connected to the south bridge 526.

The south bridge 526 is responsible for controlling many of the input/output functions of the computer system 100. In particular, the south bridge 526 may provide one or more universal serial bus ("USB") ports 532, an Ethernet controller 560, and one or more general purpose input/output ("GPIO") pins 534. The south bridge 526 may also provide a bus for interfacing peripheral card devices such as a graphics adapter 562. In one embodiment, the bus comprises a peripheral component interconnect ("PCI") bus.

The south bridge 526 is also operative to provide one or more interfaces for connecting mass storage devices to the computer system 100. For instance, according to an embodiment, the south bridge 526 includes a serial advanced technology attachment ("SATA") adapter for providing one or more serial ATA ports 536 and an ATA 100 adapter for providing one or more ATA 100 ports 544. The serial ATA ports 536 and the ATA 100 ports 544 may be, in turn, connected to one or more mass storage devices storing an operating system 540 and application programs, such as the SATA disk drive 538. As known to those skilled in the art, an operating system 540 comprises a set of programs that control operations of a computer and allocation of resources. An application program is software that runs on top of the operating system software, or other runtime environment, and uses computer resources to perform application specific tasks desired by the user.

According to one embodiment of the invention, the operating system 540 comprises the LINUX operating system. According to another embodiment of the invention, the operating system 540 comprises one of the WINDOWS® family of operating systems from MICROSOFT CORPORATION of Redmond, Wash. According to another embodiment, the operating system 540 comprises the UNIX® or SOLARIS® operating system. It should be appreciated that other operating systems may also be utilized.

The mass storage devices connected to the south bridge 526, and their associated computer-readable media, provide non-volatile storage for the computer system 100. Although the description of computer-readable media contained herein refers to a mass storage device, such as a hard disk or CD-ROM drive, it should be appreciated by those skilled in the art that computer-readable media can be any available media that can be accessed by the computer system 100. By way of example, and not limitation, computer-readable media includes volatile and non-volatile, removable and non-removable media implemented in any method or technology for storage of information such as computer-readable instructions, data structures, program modules or other data. Computer-readable media includes, but is not limited to, RAM, ROM, EPROM, EEPROM, flash memory or other solid state memory technology, CD-ROM, DVD, HD-DVD, BLU-RAY, or other optical storage, magnetic cassettes, magnetic tape, magnetic disk storage or other magnetic storage devices.

As discussed above with respect to FIG. 1, the start-up module 104 and the exception processing module 106 are stored in the non-volatile storage area 108. Implementing software modules, including the start-up module 104 and the exception processing module 106, may transform the physical structure of the storage medium that the modules are stored on. The specific transformation of physical structure may depend on various factors, in different implementations of this description. Examples of such factors may include, but are not limited to: the technology used to implement the storage media, whether the storage media are characterized as primary or secondary storage, and the like. For example, if the storage media are implemented as semiconductor-based memory, the software modules may transform the physical state of the semiconductor memory, when the software modules are stored therein. For example, the software modules may transform the state of transistors, capacitors, or other discrete circuit elements constituting the semiconductor memory.

As another example, the storage media may be implemented using magnetic or optical technology. In such implementations, the software modules may transform the physical state of magnetic or optical media, when the software modules are stored therein. These transformations may include altering the magnetic characteristics of particular locations within given magnetic media. These transformations may also include altering the physical features or characteristics of particular locations within given optical media, to change the optical characteristics of those locations. Other transformations of physical media are possible without departing from the scope and spirit of the present description, with the foregoing examples provided only to facilitate this discussion.

A low pin count ("LPC") interface may also be provided by the south bridge 526 for connecting a "Super I/O" device 570. The Super I/O device 570 is responsible for providing a number of input/output ports, including a keyboard port, a mouse port, a serial interface 572, a parallel port, and other types of input/output ports. The LPC interface may also connect a computer storage media such as a ROM or a flash memory, such as the NVRAM 574, for storing the firmware 102 and the configuration settings 114, as described above in regard to FIG. 1. In a further embodiment, the boot-fail counter 110 and the exception processing counter 112 may be further stored in the NVRAM 574. Alternatively, the boot-fail counter 110 and the exception processing counter 112 may be stored in a CMOS memory area attached to the LPC interface. By storing the boot-fail counter 110 in the CMOS memory, the boot-fail counter may be checked earlier in the boot process before the NVRAM has been initialized. This may be advantageous in resolving errors that are not related to configuration settings.

Based on the foregoing, it should be appreciated that technologies for recovering from invalid configuration settings are presented herein. Although the subject matter presented herein has been described in language specific to computer structural features, methodological acts, and computer-readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed is:

1. A non-transitory computer-readable medium having stored thereon computer-executable instructions that, when executed by a computer, cause the computer to:
   upon an initial start-up of the computer, determine whether a boot-fail counter exceeds a threshold value, the boot-fail counter representing a number of failed boot attempts the computer has had since a last successful start-up;
   upon determining that the boot-fail counter does not exceed the threshold value, increment the boot-fail counter and execute system initialization routines for booting the computer using firmware configuration settings;
   upon determining that the boot-fail counter exceeds the threshold value, execute an exception processing routine to reset a progressively larger subset of the firmware configuration settings to default firmware configuration settings as an exception processing counter is incremented; and
   upon successful completion of the system initialization routines, reset the boot-fail counter.

2. The computer-readable medium of claim 1, wherein the firmware configuration settings comprise configuration settings for a Basic Input Output System ("BIOS").

3. The computer-readable medium of claim 1, wherein the firmware configuration settings comprise configuration settings for an extensible firmware interface ("EFI").

4. The computer-readable medium of claim 1, wherein the threshold value comprises a pre-defined threshold value.

5. The computer-readable medium of claim 1, wherein the threshold value comprises a user-defined threshold value.

6. A computer-implemented method for recovering from an invalid configuration in a computer system, the method comprising:
   upon initial start-up of the computer system, determining whether a boot-fail counter stored in a non-volatile storage medium of the computer system exceeds a threshold value, the boot-fail counter representing a number of failed boot attempts the computer system has had since a last successful start-up;
   upon determining that the boot-fail counter does not exceed the threshold value, incrementing the boot-fail counter and executing system initialization routines for booting the computer system using firmware configuration settings stored in the non-volatile storage medium of the computer system;

upon determining that the boot-fail counter exceeds the threshold value, executing an exception processing routine to reset a progressively larger subset of the firmware configuration settings to default firmware configuration settings as an exception processing counter is incremented; and resetting the boot-fail counter upon successful execution of the system initialization routines.

7. The method of claim 6, wherein executing the exception processing routine comprises resetting the boot-fail counter upon successful completion of the exception processing routine.

8. The method of claim 6, wherein the firmware configuration settings comprise configuration settings for a Basic Input Output System ("BIOS").

9. The method of claim 6, wherein the firmware configuration settings comprise configuration settings for an extensible firmware interface ("EFI").

10. The method of claim 6, wherein the threshold value comprises a pre-defined threshold value.

11. The method of claim 6, wherein the threshold value comprises a user-defined threshold value.

12. A computer system comprising:

a central processing unit ("CPU");

a non-volatile storage medium operatively connected to the CPU, the non-volatile storage medium comprising a boot-fail counter representing a number of failed boot attempts the computer system has had since a last successful start-up, a firmware comprising a start-up module and an exception processing module, and configuration settings of the firmware, the start-up module of the firmware being configured to upon an initial start-up of the computer system, determine whether the boot-fail counter exceeds a threshold value, upon determining that the boot-fail counter exceeds the threshold value, call the exception processing module to execute an exception processing routine to reset a progressively larger subset of the configuration settings to default configuration settings as an exception processing counter is incremented each time the exception processing module is called by the start-up module, upon determining that the boot-fail counter does not exceed the threshold value, increment the boot-fail counter and execute system initialization routines for booting the computer system using the configuration settings of the firmware, and upon successful completion of the system initialization routines, reset the boot-fail counter.

13. The computer system of claim 12, wherein the start-up module is further configured to, upon successful completion of the system initialization routines, reset an exception processing counter.

14. The computer system of claim 12, wherein the configuration settings of the firmware comprise configuration settings for a Basic Input Output System ("BIOS").

15. The computer system of claim 12, wherein the configuration settings of the firmware comprise configuration settings for an extensible firmware interface ("EFI").

16. The computer system of claim 12, wherein the threshold value comprises a pre-defined threshold value.

17. The computer system of claim 12, wherein the threshold value comprises a user-defined threshold value.

* * * * *